(12) United States Patent
Balakrishnan et al.

(10) Patent No.: US 12,253,919 B2
(45) Date of Patent: Mar. 18, 2025

(54) METHODS AND SYSTEMS FOR PROTECTING AND RESTORING VIRTUAL MACHINES

(71) Applicant: NETAPP, INC., San Jose, CA (US)

(72) Inventors: Rajaram Balakrishnan, Fremont, CA (US); Balamurali Palaiah, Gilroy, CA (US); Jayakrishnan Ramakrishna Pillai, Tracy, CA (US); Kiran Joseph D Almeida, Bengaluru (IN); Negi Shardul Singh, Pleasanton, CA (US); Vineeth Karinta, Apex, NC (US)

(73) Assignee: NETAPP, INC., San Jose, CA (US)

( * ) Notice: Subject to any disclaimer, the term of this patent is extended or adjusted under 35 U.S.C. 154(b) by 59 days.

(21) Appl. No.: 18/112,993

(22) Filed: Feb. 22, 2023

(65) Prior Publication Data

US 2024/0193055 A1 Jun. 13, 2024

Related U.S. Application Data

(60) Provisional application No. 63/431,907, filed on Dec. 12, 2022.

(51) Int. Cl.
*G06F 11/00* (2006.01)
*G06F 9/455* (2018.01)
(Continued)

(52) U.S. Cl.
CPC ...... *G06F 11/1484* (2013.01); *G06F 9/45558* (2013.01); *G06F 9/541* (2013.01); *G06F 11/1451* (2013.01); *G06F 11/1469* (2013.01); *G06F 2009/4557* (2013.01); *G06F 2009/45583* (2013.01); *G06F 2009/45587* (2013.01); *G06F 2201/815* (2013.01)

(58) Field of Classification Search
CPC ............. G06F 11/1454; G06F 11/1451; G06F 11/1469
USPC .......................... 714/6.3, 4.11; 707/619, 639
See application file for complete search history.

(56) References Cited

U.S. PATENT DOCUMENTS 8,607,009 B2   12/2013   Nicholas et al.
8,671,406 B1   3/2014    Gopal et al.
(Continued)

FOREIGN PATENT DOCUMENTS

KR   20060123460 A   * 12/2006   .......... G06F 11/2074
KR   20140102482 A   * 8/2014

*Primary Examiner* — Chae M Ko
(74) *Attorney, Agent, or Firm* — LOZA & LOZA, LLP

(57) ABSTRACT

Methods and systems for protecting virtual machines is provided. One method includes discovering, by a first plugin, from a virtual machine ("VM") management system, a plurality of VMs that share a logical data store having a plurality of virtual volumes used for storing data for the VMs by a storage system registered with the first plugin and a virtual appliance of the VM management system; obtaining, by the first plugin, from the virtual appliance, metadata and storage layout of a set of virtual volumes used by a VM to store data; using a first application programming interface (API), by the first plugin, for identifying a first set of storage volumes used by the storage system to store data for the set of virtual volumes; and creating, by the first plugin, a consistency group ("CG") having the identified the first set of storage volumes and generating a snapshot of the CG.

20 Claims, 6 Drawing Sheets

(51) Int. Cl.
  *G06F 9/54* (2006.01)
  *G06F 11/14* (2006.01)

(56) References Cited

U.S. PATENT DOCUMENTS

| | | | |
|---|---|---|---|
| 9,003,139 | B1 | 4/2015 | Shivdeo et al. |
| 9,020,895 | B1 | 4/2015 | Rajashekar et al. |
| 10,209,909 | B1 * | 2/2019 | Wils .................. G06F 3/061 |
| 10,248,619 | B1 | 4/2019 | Kumar |
| 10,365,978 | B1 * | 7/2019 | Whitney ............ G06F 11/1464 |
| 10,387,263 | B2 | 8/2019 | Karinta et al. |
| 10,698,719 | B2 | 6/2020 | Chopra et al. |
| 10,831,618 | B1 * | 11/2020 | Potnis ................ G06F 11/1435 |
| 10,929,241 | B2 | 2/2021 | Yu et al. |
| 11,030,057 | B2 | 6/2021 | Chopra et al. |
| 11,397,650 | B1 | 7/2022 | Palaiah et al. |
| 2016/0179437 | A1 * | 6/2016 | Piduri .................... G06F 3/065 707/634 |
| 2017/0364285 | A1 * | 12/2017 | Piduri .................. G06F 3/0619 |
| 2019/0332499 | A1 * | 10/2019 | Huang .................. G06F 3/0689 |
| 2020/0034041 | A1 * | 1/2020 | Zhang ................. G06F 21/6218 |
| 2020/0349026 | A1 * | 11/2020 | Chopra .................. G06F 16/11 |
| 2021/0279088 | A1 * | 9/2021 | Kochavara .......... G06F 9/45558 |
| 2022/0179754 | A1 * | 6/2022 | Luan ........................ G06F 3/065 |
| 2022/0237049 | A1 * | 7/2022 | Wiggers ................ G06F 9/5077 |
| 2024/0192979 | A1 | 6/2024 | Balakrishnan et al. |
| 2024/0192980 | A1 | 6/2024 | Balakrishnan et al. |

\* cited by examiner

METHODS AND SYSTEMS FOR PROTECTING AND RESTORING VIRTUAL MACHINES

CROSS-REFERENCE TO RELATED APPLICATION

This application claims priority under 35 USC § 119 (e) to U.S. Provisional Application, Ser. No. 63/431,907, filed on Dec. 12, 2022, entitled "Methods and Systems for Protecting and Restoring Virtual Machines," the disclosure of which is incorporated herein by reference in its entirety.

TECHNICAL FIELD

The present disclosure relates to networked storage systems and more particularly to, protecting and restoring virtual machines.

BACKGROUND

Various forms of storage systems are used today. These forms include direct attached storage (DAS) systems, network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices. The storage operating system typically uses storage volumes for NAS systems (may also be referred to as volumes) (or logical unit numbers (LUNS) for SANs) to store data. Each volume may be configured to store data files (i.e., data containers or data objects), scripts, word processing documents, executable programs, and any other type of structured or unstructured data. From the perspective of a computing device using the storage system, each volume can appear to be a single storage drive. However, each volume can represent the storage space in one storage device, an aggregate of some or all the storage space in multiple storage devices.

Storage systems are used extensively in virtual environments where a physical resource is time-shared among a plurality of independently operating processor executable virtual machines. Typically, storage space is presented to a virtual machine as a virtual file or virtual disk. A storage drive (for example, C:\) is then presented on a computing device via a user interface within a virtual machine context. The virtual machine can use the virtual storage drive to access storage space to read and write information.

In some virtual environments, virtual machines are provided virtual volumes (vVols) to store data. vVols are logical structures addressable by a virtual machine for storing and retrieving data. vVols are part of a virtual datastore, referred to as a vVol datastore. The vVol datastore acts as a logical container for the vVols. Multiple virtual machines may use different vVols and different storage volumes of storage systems to store data. To protect virtual machines, conventional technology takes a backup of the entire vVol datastore and all the volumes within the vVol datastore. This makes restoring a specific virtual machine that shares the vVol datastore difficult. Continuous efforts are being made to develop technology to efficiently protect and restore individual virtual machines using a vVol datastore.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures.

DETAILED DESCRIPTION

In one aspect, innovative computing technology is disclosed to protect specific virtual machine (also referred to as a "VM") related data at a granular level. VMs are executed in a virtual machine environment and time-share a physical resource. A VM functions as a self-contained platform, running its own operating system (OS) and computer executable, application software. As described below in detail, VMs are presented with storage space to store VM data as files (also referred to as data containers). A plurality of VMs can share a plurality of storage volumes (also referred interchangeably as "volumes") to store and retrieve data. The volumes are configured to be part of a volume group that operates as an independent logical structure.

To protect VM files, a consistency group ("CG") snapshot is taken of the volumes that store the VM files. The CG snapshot creates a consistency point for the volumes of the volume group to ensure that all the data captured by the CG snapshot across the volume is consistent. Details regarding the innovative technology are provided below.

As preliminary note, the terms "component", "module", "system," and the like as used herein are intended to refer to a computer-related entity, either software-executing general-purpose processor, hardware, firmware and a combination thereof. For example, a component may be, but is not limited to being, a process running on a processor, a hardware-based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), solid state drive, hard disk, EEPROM (electrically erasable programmable read only memory), non-volatile memory or any other storage device, in accordance with the claimed subject matter.

Figure 1A:
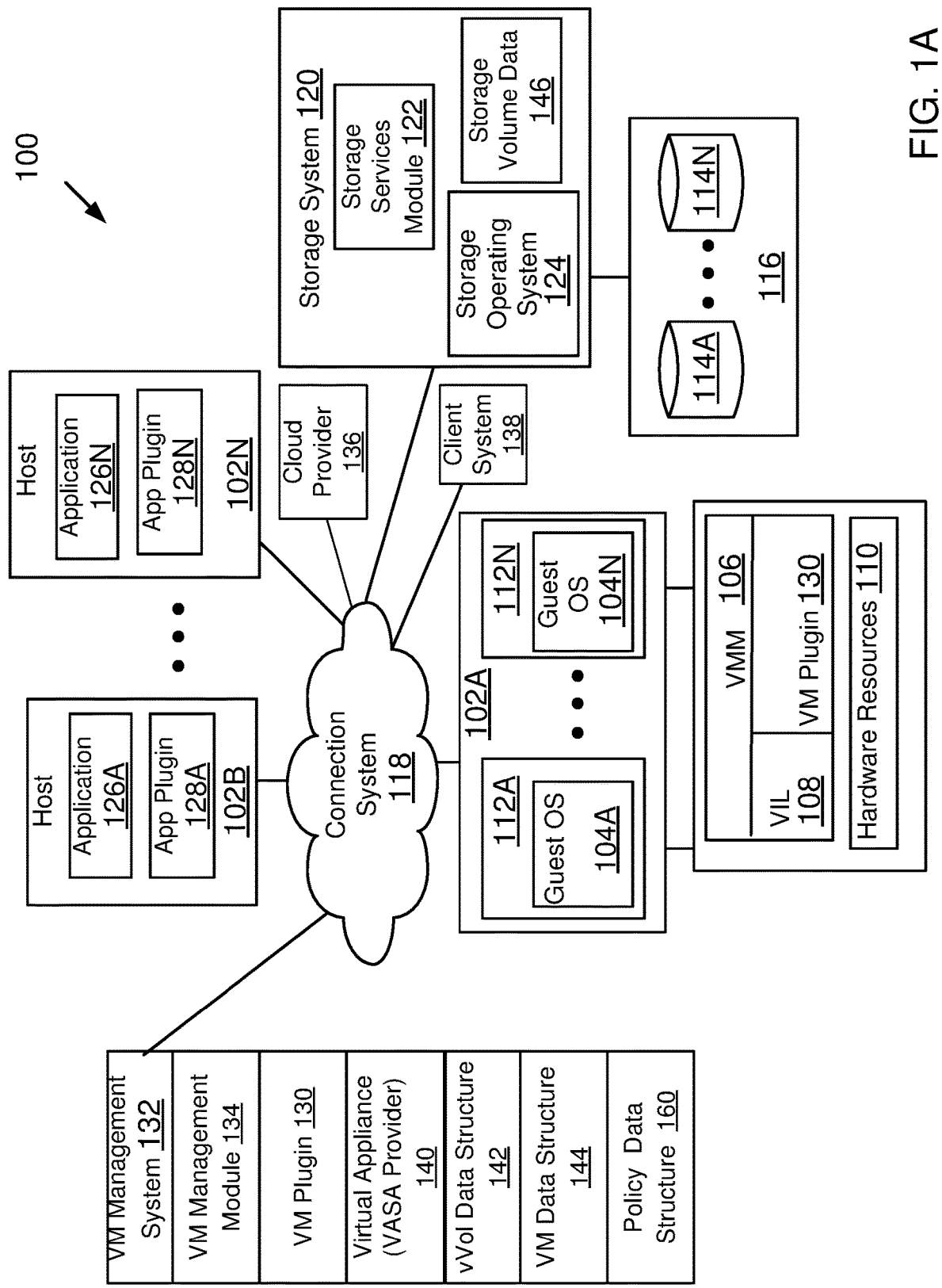
FIG. 1A shows an example of an operating environment for the various aspects of the present disclosure.

System 100: FIG. 1A shows an example of a system 100, to implement the various adaptive aspects of the present disclosure. In one aspect, system 100 includes computing systems 102A-102N (shown as host 102A-102N and may also be referred to as a "host system 102", "host systems 102", "server 102" or "servers 102") communicably coupled to a storage system 120 executing a storage operating system 124 and a storage services module 122 via a connection system 118 such as a local area network (LAN), wide area network (WAN), the Internet and others. As described herein, the term "communicably coupled" may refer to a direct connection, a network connection, or other connections to enable communication between computing and network devices.

In one aspect, system 100 may also include a cloud provider 136 (e.g., Amazon Web Services ("AWS") provided by Amazon Inc, Azure provided by Microsoft Corporation, Google Cloud Platform provided by Alphabet Inc. (without derogation of any trademark rights of Amazon Inc., Microsoft Corporation or Alphabet Inc.), or any other cloud provider) that provides access to cloud-based storage via a cloud layer (not shown) executed in a cloud computing environment. Cloud computing means computing capability that provides an abstraction between the computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" herein is intended to refer to a network, for example, the Internet and cloud computing allows shared resources.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. After the application layer is a cloud platform and cloud infrastructure, followed by a "server" layer that includes hardware and computer software designed for cloud specific services.

One or more of the host systems (for example, 102A) may execute a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host system) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

Referring back to FIG. 1A, host system 102A provides a processor executable virtual machine environment executing a plurality of VMs 112A-112N (may also be referred to as "VM 112" or "VMs 112"). VMs 112A-112N execute a plurality of guest OS 104A-104N (may also be referred to as guest OS 104) that share hardware resources 110. As described above, hardware resources 110 may include CPU, memory, I/O devices, storage or any other hardware resource.

In one aspect, host system 102A may also include a virtual machine monitor (VMM) 106, for example, a processor executed hypervisor layer provided by VMWare Inc., Hyper-V layer provided by Microsoft Corporation of Redmond, Washington (without derogation of any third-party trademark rights) or any other layer type. VMM 106 presents and manages the plurality of guest OS 104A-104N executed by the host system 102A.

In one aspect, VMM 106 is executed by host system 102A with VMs 112A-112N. In another aspect, VMM 106 may be executed by an independent stand-alone computing system, often referred to as a hypervisor server or VMM server and VMs 112A-112N are presented on another computing system.

It is noteworthy that various vendors provide different virtualization environments, for example, VMware Corporation, Microsoft Corporation and others (without derogation of any third-party trademark rights). The generic virtualization environment described above with respect to FIG. 1A may be customized depending on the virtual environment provider.

VMM 106 may include or interface with a virtualization layer (VIL) 108 that provides one or more virtualized hardware resource 110 to each OS 104A-104N. VMM 106 also includes or interfaces with a hypervisor plugin (shown as VM plugin 130).

System 100 also includes a virtual machine ("VM") management system 132 that executes instructions for a VM management module (or application) 134 for managing VMs and interfacing with VMM 106. An example of the VM management system 132 is a "vCenter" server provided by VMWare Inc. (without derogation of any third-party trademark rights) that is used to manage VMs and host systems (e.g., 102A) that host VMs. As described below in more detail, VMs are presented with vVols that are part of a framework defined by the VM provider. vVols virtualize storage area network (SAN)/Networked Attached storage arrays (NAS) and encapsulate virtual disks and other virtual machine files to natively store files in the storage system 120. In one aspect, vVols are part of a vVol datastore (see FIG. 1C), a logical container that hosts multiple vVols for different VMs. Data for each vVol is stored at one or more storage volume, managed by the storage system 120, as described below in detail.

An example of the VM management application 134 is "vSphere," (without derogation of any third-party trademark rights) a software package provided by VMware Inc. that assists in hosting VMs. It is noteworthy that vSphere and vCenter are simply mentioned as examples of systems that can use the adaptive aspects of the present disclosure and the adaptive aspects of the present disclosure are not limited to these commercial systems/terms.

In one aspect, the VM management system 132 includes or interfaces with a VM plugin 130 that coordinates VM protection and attaching a virtual disk for restore operations as described below. The term plugin as used herein means a processor executable software layer/code customized to interface with a specific application, e.g., a virtual machine, a database application, a file system, an operating system, and others, described below in detail. The term protect means to backup an application and/or backup associated information (including configuration information, data (e.g., files, directories, structured or unstructured data, may jointly be referred to as data containers) and others).

A virtual appliance 140 (also referred to as appliance 140 or "VASA" (vSphere APIs for Storage Awareness) provider 140) interfaces with the VM plugin 130 and the VM management application 134 for protection and attaching a virtual disk for a restore operation described below. The appliance 140 includes a set of application programming interface (s)(APIs) that enable the storage system 120 to become aware of vVols and their associations with relevant VMs. The appliance 140 is a storage-side software component that acts as a "storage awareness" service/tool for the VM management application 134. The appliance 140 obtains information about available storage topology, capabilities, and status that is used for backup and restore operations.

In one aspect, the management system 132 includes or has access to a vVol data structure 142, a VM data structure 144 and a policy data structure 160 that are stored in a storage device and are accessible to the VM plugin 130 and the appliance 140 for executing backup, attaching a virtual disk and restore operations, as described below in detail. The policy data structure 160 includes policy objects to store various policies each with a set of attributes that can be applied to any VM/vVol. The policy data structure 160 stores a policy identifier, a policy name, description, a backup schedule policy, a retention count as to how long a backup is to be retained, a replication policy to replicate a backup from one location to another, types of backups, application consistent backups, and verification policies to verify a backup and others.

In one aspect, host systems 102B-102N may execute a plurality of applications 126A-126N (may also be referred to as "application 126" or "applications 126"), for example, an email server (Exchange server), a database application and others. These applications may be executed in different operating environments, for example, a virtual machine environment of host 102A, Windows, Solaris, Unix and others. The applications 126 may use storage system 120 to store information, as described below. To protect information associated with each application, a plugin module (shown as application plugins 128A-128N) are executed at host systems 102.

In one aspect, the storage system 120 has access to a set of mass storage devices 114A-114N (may be referred to as "storage devices 114" or "storage device 114") within at least one storage subsystem 116. The storage devices 114 may include writable storage device media such as solid-state drives, storage class memory, magnetic disks, video tape, optical, DVD, magnetic tape, non-volatile memory devices for example, self-encrypting drives, or any other storage media adapted to store structured or non-structured data. The storage devices 114 may be organized as one or more groups of Redundant Array of Independent (or Inexpensive) Disks (RAID). The various aspects disclosed are not limited to any specific storage device or storage device configuration.

The storage system 120 provides a set of storage volumes to host systems 102 via the connection system 118. The storage operating system 124 can present or export data stored at storage devices 114 as a volume (or a LUN for SAN based storage). Each volume may be configured to store data files (or data containers or data objects), scripts, word processing documents, executable programs, and any other type of structured or unstructured data. From the perspective of one of the client systems, each volume can appear to be a single storage drive. However, each volume can represent the storage space in one storage device, an aggregate of some or all the storage space in multiple storage devices, a RAID group, or any other suitable set of storage space. An aggregate is typically managed by the storage operating system 124 and identified by a unique identifier (not shown).

The storage system 120 may be used to store and manage information at storage devices 114 based on a request generated by application 126 executed by host system 102 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests are sent over connection system 118 to the storage system 120. Storage system 120 receives the I/O requests, issues one or more I/O commands to storage devices 114 to read or write the data on behalf of the host system 102 and issues a response containing the requested data over the network 118 to the respective host system 102.

Although storage system 120 is shown as a stand-alone system, i.e., a non-cluster-based system, in another aspect, storage system 120 may have a distributed architecture; for example, a cluster-based system that may include a separate network module and storage module. Briefly, the network module is used to communicate with host systems 102, while the storage module is used to communicate with the storage devices 114.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

In one aspect, the storage services module 122 at the storage system 120 coordinates volume backups, cloning, restore and replication for different VMs. Although the storage services module 122 is shown as a single block, it may include various modules for taking backups, executing restore operations, replicating backups from one location to another and so forth. As described below, backups and other operations may be performed using the VM management system 132. As an example, taking backups may include taking "snapshots," i.e., a point-in-time copy of a volume. The point-in-time copy captures all the information in a volume. The snapshot may be used to restore a volume at any given time, as described below.

Figure 1B:
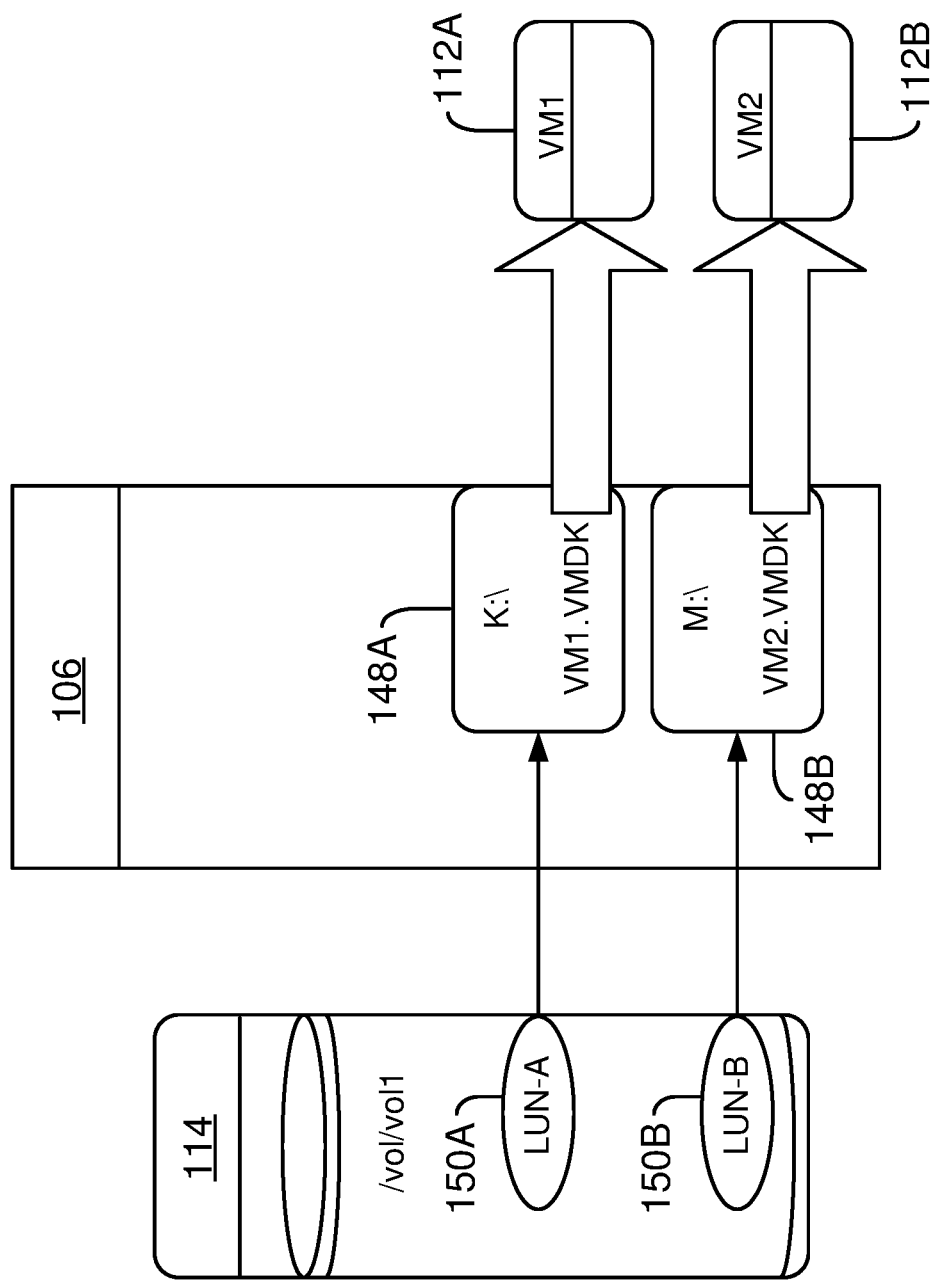
FIG. 1B shows an example of presenting storage space to a virtual machine, according to one aspect of the present disclosure.

VM Virtual Storage: Before describing the details of the various aspects of the present disclosure, the following provides an example of presenting logical storage space to one or more VMs with respect to FIG. 1B. Storage space is typically presented as a virtual storage drive (for example, LUNs, virtual hard disks ("VHDs"), virtual machine disks "VMDKs" or any other format) to VMM 106. For example, LUN-A 150A and LUN-B 150B at storage device 114 for a storage volume labeled as "vol1" are presented to VMM 106 that hosts VMs 112A (VM1)-112B (VM2).

VMM 106 creates a file system on the LUNs and generates one or more virtual drive files. e.g., in a VMDK or VHD format. VMDK and VHD are two common virtual drive formats that are commonly used by VMs to access storage. The VM is then presented with a storage drive to store data. For example, VM1. VMDK 148A is created on LUN-A 150A and then presented as drive K:\ to VM1 112A. An application in VM1 112A uses K:\ to access storage space for reading and writing information. Similarly, VM2. VMDK 148B is created on LUN-B 150B and appears as M:\ drive for VM 112B. An application in VM2 112B uses M:\ drive to store information. It is noteworthy that different operating systems may present virtual storage drives in different formats. The various aspects described herein are not limited to any particular format.

Figure 1C:
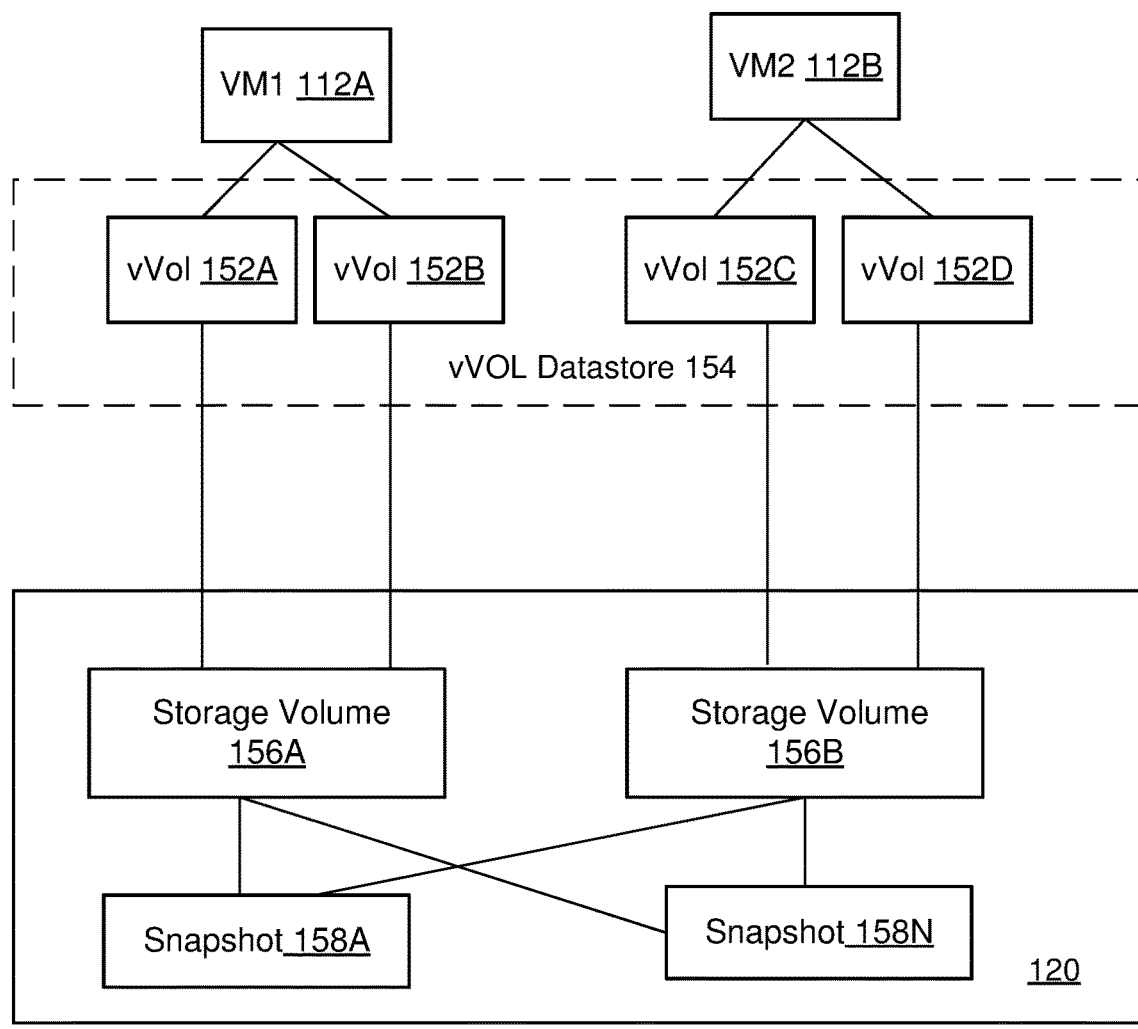
FIG. 1C shows an example of using a virtual volume datastore (vVol), according to one aspect of the present disclosure.

In some instances, VMM 106 does not create a file system for the LUNs and instead the LUNs are presented directly to the VM as a storage drive. The storage drives in such an instance may be referred to as "pass through" drives. The terms VMDK/VHD and pass-through disks as used herein for presenting a virtual storage drive via a VM are used interchangeably throughout this specification.

vVol Datastore 154: FIG. 1C shows an example of using a vVol data store 154. The vVol datastore 154 is a logical structure that can be defined by a VM provider. The vVol data store 154 is made available by the VM management application 134. The vVol data store 154 is uniquely identified and may include one or more vVols 152A-152D. As an example, vVol 152A and 152B are used by VM1 112A and vVols 152C and 152D are used by VM2 112B to store data. The data for the vVols 152A-152D is stored using storage volumes 156A and 156B that are managed by the storage operation system 124 (FIG. 1A) of the storage system 120. The storage volumes 156A/156B are backed up by taking snapshots 158A-158N, over time. In one aspect, the virtual appliance 140 provisions the vVols for each VM based on a storage profile indicating a service level for each vVol. The storage volumes are selected based on the meeting the service level associated with each vVol.

Prior to the adaptive aspects of the present disclosure, to protect a VM, the storage system 120 takes a backup of the entire vVol datastore 154 i.e., all the storage volumes within the vVol datastore. This is undesirable because the vVol data store includes various volumes and taking a snapshot of all the volumes consumes storage space and slows down the overall backup process. Furthermore, to restore a specific VM, one has to drill down into the backup of the entire vVol datastore, which again is inefficient. The technology disclosed herein solves these conventional challenges, as described below in detail.

Figure 2A:
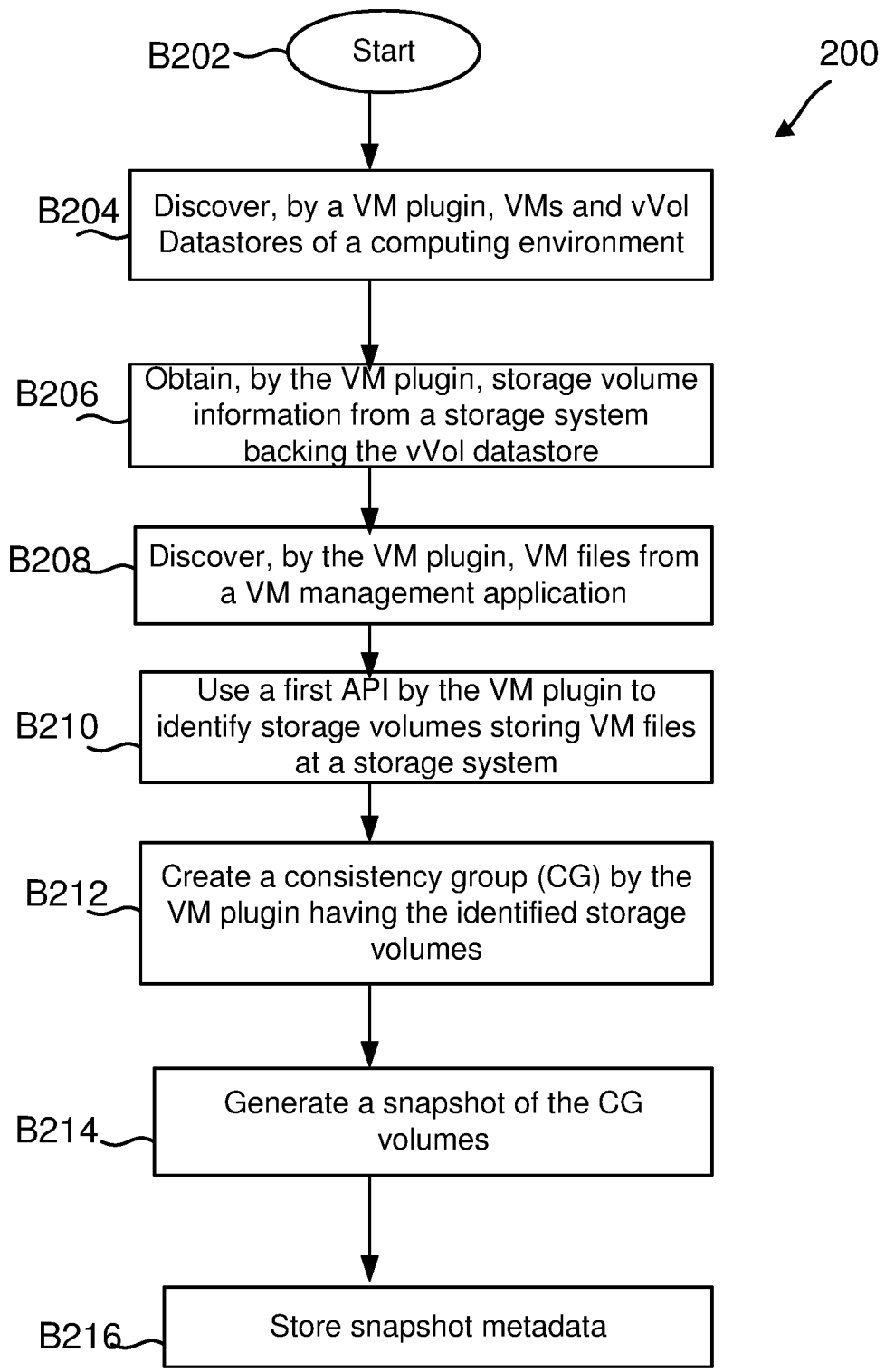
FIG. 2A shows a process flow for taking a backup of a virtual machine, according to one aspect of the present disclosure.

Process Flows: FIG. 2A shows a process flow 200 for selectively protecting a VM (e.g., 112A, FIG. 1C) and VM specific data that is stored using one or more vVols (e.g., 152A/152B) of a vVol datastore (e.g., 154), according to one aspect of the present disclosure. Process 200 begins in block B202, after VMs 112A-112N have been configured, e.g., using the VM management application 134. The VM data structure 144 stores a unique identifier identifying each VM, a vVol identifier that identifies the vVol assigned to each VM, a host system (e.g., 102A) identifier identifying the host system hosting the VMs, permissions and credentials for accessing the VMs or any other information. The vVol data structure 142 stores vVol configuration information, e.g., vVol identifier, VMs associated with the vVols, service levels that indicate the service level objectives for each vVol, vVol size, VM files that store data using the vVols, and the vVol datastore associated with each vVol. In one aspect, the vVol data structure 142 stores a mapping of each vVol, VM and vVol data store. The storage operating system 124 maintains the mapping between vVols and the storage volumes 156A/156B at storage volume data 146 (FIG. 1C). The storage volume data 146 also stores a unique identifier for each storage volume, a mapping of VM files to the storage volumes, VM file storage path indicating where data for VM files are stored, or any other information. In one aspect, the storage system 120 is registered with the VM plugin 130 to enable the VM plugin 130 to interface with the storage system 120 using one or more APIs.

In block B204, the VM plugin 130 discovers the VMs 112A-112N and the vVol datastore 154 used by the VMs. The VM plugin 130 may use an API provided by the VM management application 134 to obtain this information from vVol data structure 142 and the VM data structure 144 that are maintained or are accessible by the VM management application 134. The VM plugin 130 also obtains the layout and metadata associated with the vVols used by a VM, e.g., 112A to store data. This information is stored in VVOL data structure 142 and may be obtained from the virtual appliance 140.

In block B206, the VM plugin 130 discovers the storage volumes 156A/156B that are used to store data from the vVols. In one aspect, the VM plugin 130 obtains this information from appliance 140 that maintains a mapping of the vVol datastores and storage volumes.

In block B208, the VM plugin 130 discovers the files that are used by the VM 112A. This information may be obtained from the VM management application 134.

In block B210, the VM plugin 130 identifies storage volume 156A that store data for VM 112A and vVols 152A/152B. This information is obtained by a first API that interfaces with the storage system 120 and the VM plugin 130. The storage system 120 maintains a mapping of the storage volumes used by each vVol data store. The first API may be a REST API or any other API type.

In block B212, the VM plugin 130 creates a consistency group ("CG") to take a snapshot of the storage volumes used by VM 112A. In one aspect, the CG includes storage volumes of similar storage capabilities/storage profile to ensure compliance with service level objectives defined by the policy data structure 160.

In block B214, a snapshot of the CG is generated. In one aspect, the VM plugin 130 coordinates the snapshot with the storage services module 122 of the storage system 120 via APIs that can communicate with the storage system 120. The snapshot is a consistent, point-in-time copy of the storage volumes in the CG that store VM files. After the snapshot is taken, the snapshot metadata is stored in block B216. The stored metadata includes a snapshot identifier, the size of the snapshot, a file path indicating the location where the snapshot is stored, VM files that are associated with the snapshot, the vVol datastore and the vVols associated with the snapshot. In one aspect, the snapshot metadata is accessible to the VM plugin 130.

Figure 2B:
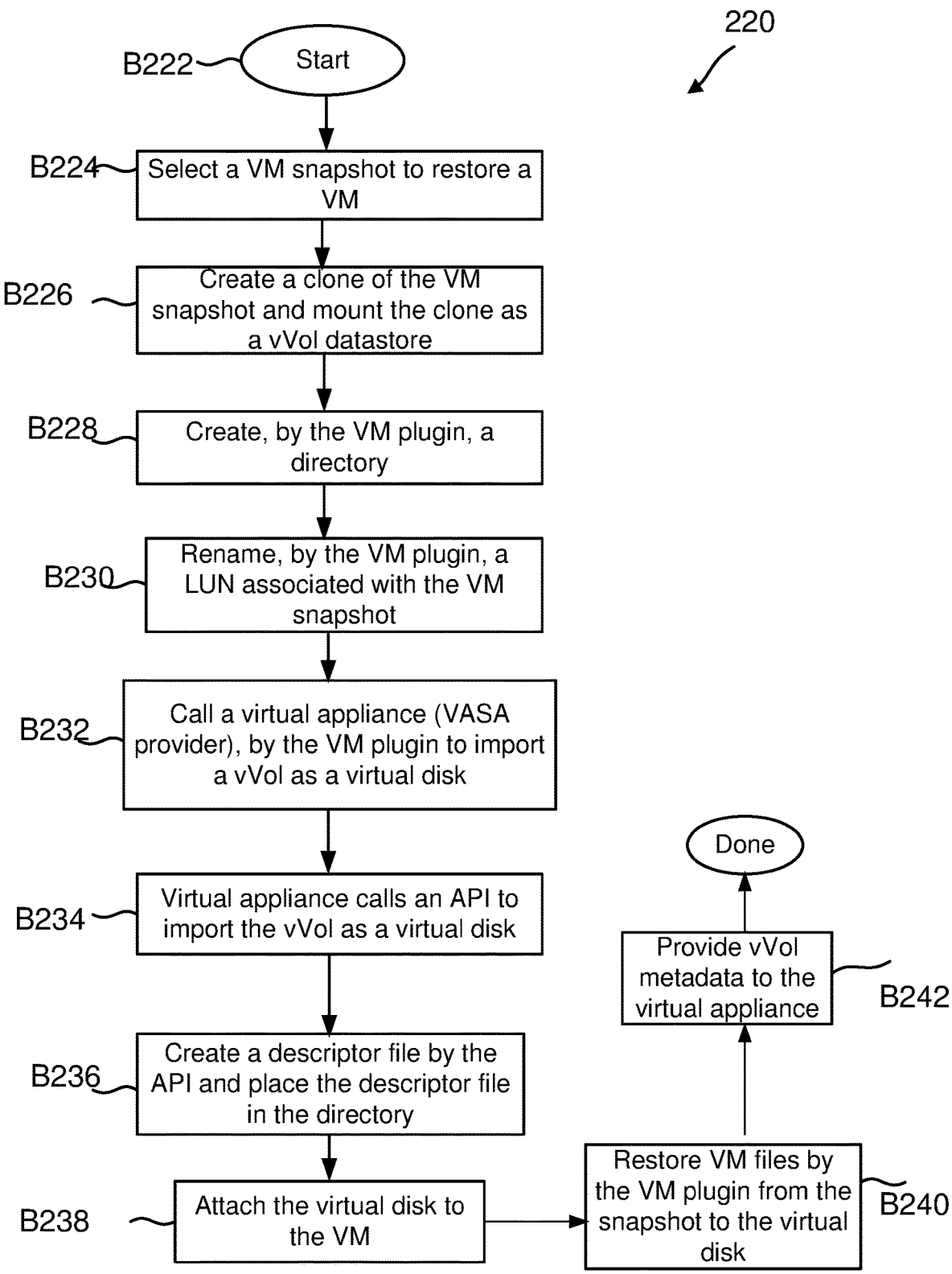
FIG. 2B shows a process flow for attaching a virtual disk and restoring a virtual machine, according to one aspect of the present disclosure.

FIG. 2B shows an example of an innovative, processor executable process 220 for attaching a virtual drive to a VM for restoring a VM using a vVol datastore, according to one aspect of the present disclosure. Process 220 begins in block B222, after process 200 has been executed and a snapshot of a VM (e.g., 112A) has been taken using a CG. In block B224, a VM snapshot is selected to attach a virtual disk for restoring the VM. In one aspect, the operation to attach the virtual disk is referred to as "attach disk operation," which occurs before the VM can be restored. In one aspect, the VM management application 134 is used to select the VM and a corresponding snapshot to attach the virtual disk. The selection can be made via a graphical user interface (GUI) or a command line interface presented by the VM management module 134.

In block B226, the VM plugin 130 creates a clone of the selected snapshot, determines the storage volumes storing the data for the VM 112A and mounts the clone as a vVol datastore. In one aspect, the clone of the snapshot is a logical structure that has a unique identifier and points to the same storage locations where the snapshot data is stored. This saves storage space because data is not stored twice, once for the snapshot and then for the clone. At this stage, the mounted vVol is empty and does not show the contents of the vVol datastore via the VM management application 134.

To access the vVols, in B228, the VM plugin 130 creates a directory/logical structure to which one or more virtual drives (e.g., VMDKs) will be attached. To avoid conflict with the vVol identifiers, in block B230, the VM plugin 130 renames the LUN associated with the snapshot/vVols. Thereafter, in block B232, the VM plugin 130 calls the virtual appliance 140 to import the vVol(s) of the vVol datastore as one or more virtual disks. In response, in block B234, the virtual appliance 140 calls an API to import each vVol as a virtual disk. The API in this instance is aware of the VM management module 134 i.e., the API understands the commands, data structures and layouts used by VM management module 134 to execute operations.

In block B236, the API creates a virtual disk descriptor file that is placed within the newly created directory. As an example, the descriptor file is in the following format: <vm name>.vmdk. The descriptor file includes configuration information about a VM's virtual hard drive, a virtual equivalent of a physical drive, where data is written. The VM plugin 130 is notified of the virtual drive and the descriptor file.

In block B238, the VM plugin 130 attaches the virtual disk to the VM 112A. Thereafter, in block B240, all the files from the snapshot are restored by the VM plugin 130. The metadata for the restored vVol is provided to the virtual appliance 140. Because a snapshot of a storage volume is imported as vVol, the snapshot taken by the storage system 120 can be managed from the VM management system 132.

The technology disclosed herein provides consistency for the snapshot taken in block B214 of FIG. 2A because of the CG. The technology enables a system to take any number of snapshots. In some virtual environments, the VM management system 132 limits the number of snapshots. The VM plugin 130 enables any number of snapshots. The number of snapshots is optimized because the VM plugin 130 first discovers the vVol datastore, identifies the storage volumes that are used to store data for a specific VM and takes a snapshot of only the storage volumes used by the VM. This better utilizes the storage space in the storage system 120 vis-à-vis systems that take a snapshot of all the storage volumes supporting a vVol datastore.

In one aspect, one or more methods executed by one or more processors are disclosed. For example, one method includes discovering (e.g., B204, FIG. 2A), by a first plugin (e.g., 130, FIG. 1A), from a virtual machine ("VM") management system (e.g., 134, FIG. 1A), a plurality of VMs (e.g., 112A-112N) that share a logical data store (e.g., 154, FIG. 1C) having a plurality of virtual volumes (e.g., 152A-152D, FIG. 1C) used for storing data for the VMs by a storage system (e.g., 120, FIG. 1C) registered with the first plugin and a virtual appliance (e.g., 140, FIG. 1A) of the VM management system; obtaining (e.g., B206, FIG. 2A), by the first plugin, from the virtual appliance, metadata and storage layout of a set of virtual volumes used by a VM to store data; using (e.g., B210, FIG. 2A) a first application programming interface (API), by the first plugin, for identifying a first set of storage volumes used by the storage system to store data for the set of virtual volumes; and creating (e.g., B212, FIG. 2A), by the first plugin, a consistency group ("CG") having the identified the first set of storage volumes and generating (e.g., B214, FIG. 2A) a snapshot of the CG.

The method further includes creating (e.g., B228, FIG. 2B), by the first plugin, a directory for the VM for a restore operation to restore the VM from the snapshot; renaming (e.g., B230, FIG. 2B), by the first plugin, a logical object associated with the snapshot; calling (e.g., B232, FIG. 2B), by the first plugin, the virtual appliance to import the renamed logical object as a virtual volume for the restore operation; utilizing (e.g., B234, FIG. 2B), by the virtual appliance, a second API to import the virtual volume as a virtual disk, the second API creating (e.g., B236, FIG. 2B) a virtual disk descriptor file for the restore operation, the virtual disk descriptor file stored within the directory; and attaching (e.g., B238, FIG. 2B), by the first plugin, the virtual disk with the VM.

The method further includes restoring (e.g., B240, FIG. 2B), by the first plugin, the VM and providing virtual volume metadata to the virtual appliance for the restored VM. The method further includes grouping (e.g., B212, FIG. 2A), by the first plugin, the first set of storage volumes for taking the snapshot, based on a storage profile indicating a service level for the set of virtual volumes.

The method further includes discovering e.g., B204, FIG. 2A), by the first plugin, all storage volumes within the logical data store; and identifying (e.g., B212, FIG. 2A), by the first plugin, the first set of storage volumes from the discovered storage volumes. The method further includes provisioning (e.g., see paragraph [0046]), by the virtual appliance, the set of virtual volumes for the VM based on a service level defined by a storage profile. In one aspect, the first plugin obtains (e.g., B210, FIG. 2A) VM files from the VM management system and uses the first API to obtain the first set of storage volumes from a storage operating system of the storage system.

Figure 3:
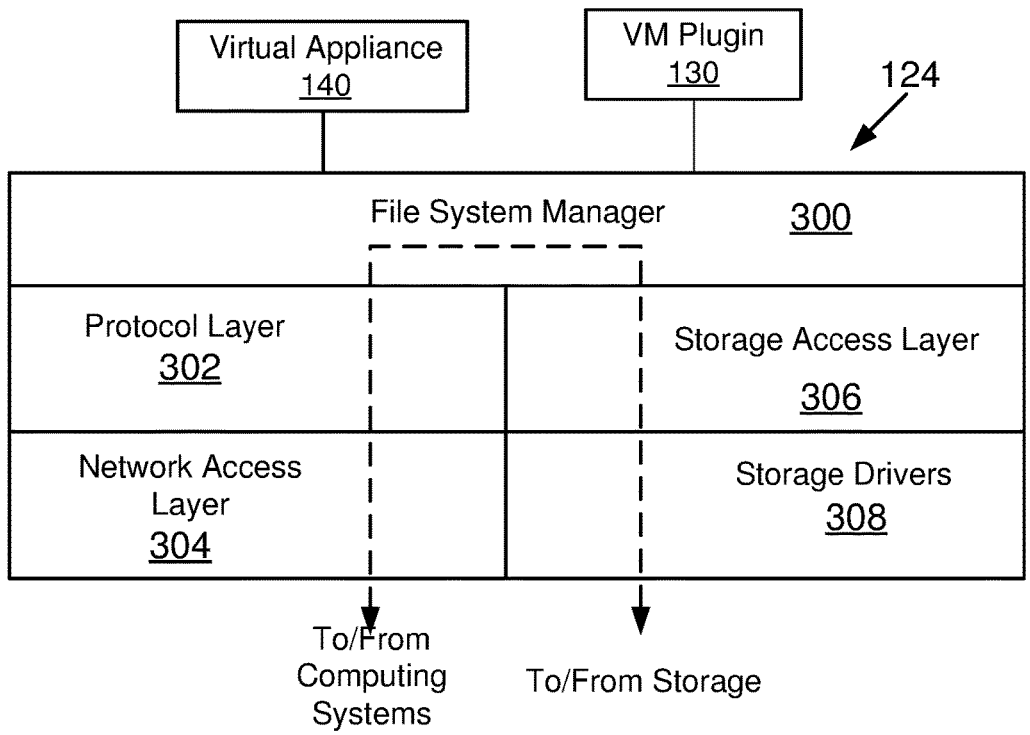
FIG. 3 shows an example of a storage operating system, used according to one aspect of the present disclosure.

Storage Operating System: FIG. 3 illustrates a generic example of storage operating system 124 executed by the storage system 120 and interfacing with the virtual appliance 140 and the VM plugin 130 via one or more storage system APIs, according to one aspect of the present disclosure. The storage operating system 124 maintains various stored objects and data containers. The virtual appliance 140 and the VM plugin 130 communicate with different layers of storage operating system 124 for providing storage services in system 100 including backup and restore, described above in detail.

As an example, the storage operating system 124 may include several modules, or "layers". These layers include a file system manager 300 that keeps track of a directory structure (hierarchy) of the data stored in storage devices and manages read/write operations, i.e., executes read/write operations on storage devices in response to server system 102 requests.

The storage operating system 124 may also include a protocol layer 302 and an associated network access layer 306, to allow system 100 components to communicate over a network with other systems, such as server system 102 and management system 132. Protocol layer 302 may implement one or more of various higher-level network protocols, such as NFS, CIFS, Hypertext Transfer Protocol (HTTP), TCP/IP and others.

Network access layer 304 may include one or more drivers, which implement one or more lower-level protocols to communicate over the network, such as Ethernet. Interactions between server systems 102 and mass storage devices 114 are illustrated schematically as a path, which illustrates the flow of data through the storage operating system 124.

The storage operating system 124 may also include a storage access layer 306 and an associated storage driver layer 30 to communicate with a storage device. The storage access layer 306 may implement a higher-level storage protocol, such as RAID (redundant array of inexpensive disks), while the storage driver layer 308 may implement a lower-level storage device access protocol, such as FC, SCSI or any other protocol.

It should be noted that the software "path" through the storage operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

As used herein, the term "storage operating system" generally refers to the computer-executable code operable on a computer to perform a storage function that manages data access and may implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems.

Figure 4:
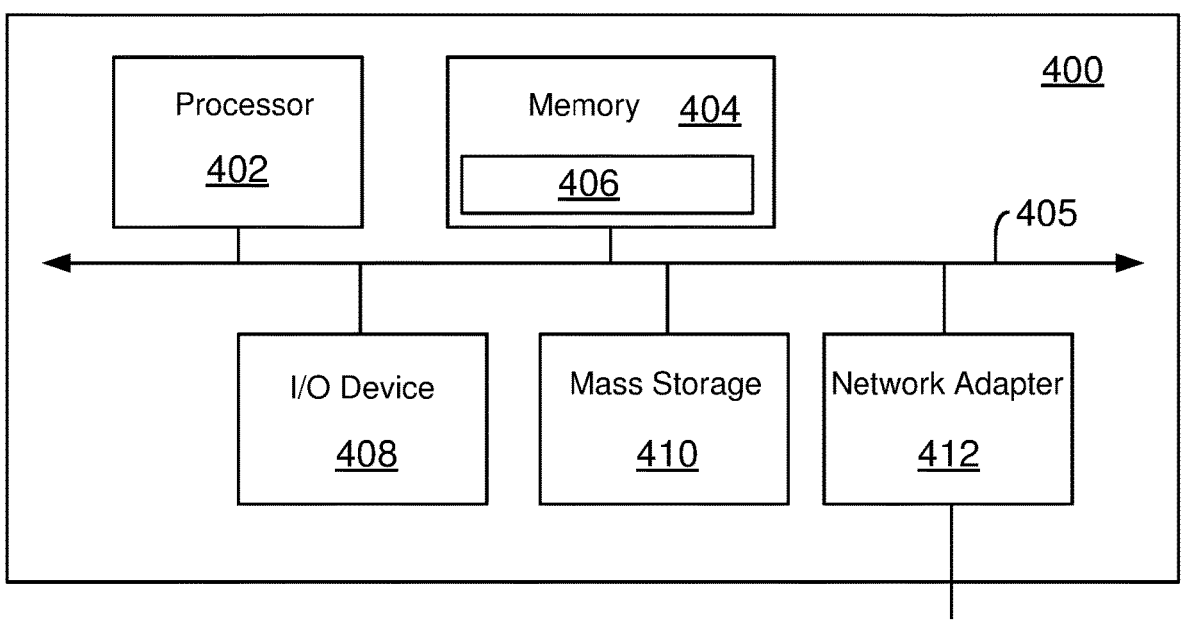
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent modules of the management system 132, host 102, storage system 120, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used for executing the process blocks of FIGS. 2A-2B, data structures of FIG. 1BA (i.e., 142, 144), VM plugin 130, VM management application 134, virtual appliance 140 and the various plugins/applications.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, methods and apparatus for protecting virtual machines have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:
    discovering, by a first plugin, from a virtual machine ("VM") management system, a plurality of VMs that share a logical data store having a plurality of virtual volumes used for storing data for the VMs by a storage system registered with the first plugin and a virtual appliance of the VM management system;
    obtaining, by the first plugin, from the virtual appliance, metadata and storage layout of a set of virtual volumes used by a VM to store data;
    using a first application programming interface (API), by the first plugin, for identifying a first set of storage volumes used by the storage system to store data for the set of virtual volumes used by the VM; and
    creating, by the first plugin, a consistency group ("CG") having the identified first set of storage volumes used by the storage system to store the data for the set of virtual volumes used by the VM and generating a snapshot of the CG to take a snapshot of only the storage volumes in the first set of storage volumes used by the VM.

2. The method of claim 1, further comprising:
    creating, by the first plugin, a directory for the VM to attach a virtual disk to the VM for a restore operation.

3. The method of claim 1, further comprising:
    grouping, by the first plugin, the first set of storage volumes for taking the snapshot, based on a storage profile indicating a service level for the set of virtual volumes.

4. The method of claim 1, further comprising:
    discovering, by the first plugin, all storage volumes within the logical data store.

5. The method of claim 4, further comprising:
    identifying, by the first plugin, the first set of storage volumes from the discovered storage volumes.

6. The method of claim 1, further comprising:
    provisioning, by the virtual appliance, the set of virtual volumes for the VM based on a service level defined by a storage profile.

7. The method of claim 1, wherein the first plugin obtains VM files from the VM management system and uses the first API to obtain the first set of storage volumes from a storage operating system of the storage system.

8. A non-transitory computer-readable storage medium having stored thereon instructions comprising computer executable code, which when executed by a computer with at least one processor, causes the at least one processor to:
    discover, by a first plugin, from a virtual machine ("VM") management system, a plurality of VMs that share a logical data store having a plurality of virtual volumes used for storing data for the VMs by a storage system registered with the first plugin and a virtual appliance of the VM management system;
    obtain, by the first plugin, from the virtual appliance, metadata and storage layout of a set of virtual volumes used by a VM to store data;
    use a first application programming interface (API), by the first plugin, for identifying a first set of storage volumes used by the storage system to store data for the set of virtual volumes used by the VM;
    create, by the first plugin, a consistency group ("CG") having the identified first set of storage volumes used by the storage system to store the data for the set of virtual volumes used by the VM and generate a snapshot of the CG to take a snapshot of only the storage volumes in the first set of storage volumes used by the VM.

9. The non-transitory computer-readable storage medium of claim 8, wherein the computer executable code, which when executed by the computer with the at least one processor, further causes the at least one processor to:
    create, by the first plugin, a directory for the VM to attach a virtual disk to the VM for a restore operation.

10. The non-transitory computer-readable storage medium of claim 8, wherein the computer executable code, which when executed by the computer with the at least one processor, further causes the at least one processor to:
    group, by the first plugin, the first set of storage volumes for taking the snapshot, based on a storage profile indicating a service level for the set of virtual volumes.

11. The non-transitory computer-readable storage medium of claim 8, wherein the computer executable code, which when executed by the computer with the at least one processor, further causes the at least one processor to:
    discover, by the first plugin, all storage volumes within the logical data store.

12. The non-transitory computer-readable storage medium of claim 11, wherein the computer executable code, which when executed by the computer with the at least one processor, further causes the at least one processor to:
    identify, by the first plugin, the first set of storage volumes from the discovered storage volumes.

13. The non-transitory computer-readable storage medium of claim 8, wherein the computer executable code, which when executed by the computer with the at least one processor, further causes the at least one processor to:
    provision, by the virtual appliance, the set of virtual volumes for the VM based on a service level defined by a storage profile.

14. The non-transitory computer-readable storage medium of claim 8, wherein the first plugin obtains VM files from the VM management system and uses the first API to obtain the first set of storage volumes from a storage operating system of the storage system.

15. A system, comprising:
    a memory containing at least one computer-readable medium comprising computer executable code having stored thereon instructions; and
    a processor coupled to the memory to execute the computer executable code to:
    discover, by a first plugin, from a virtual machine ("VM") management system, a plurality of VMs that share a logical data store having a plurality of virtual volumes used for storing data for the VMs by a storage system registered with the first plugin and a virtual appliance of the VM management system;
    obtain, by the first plugin, from the virtual appliance, metadata and storage layout of a set of virtual volumes used by a VM to store data;
    use a first application programming interface (API), by the first plugin, for identifying a first set of storage volumes used by the storage system to store data for the set of virtual volumes used by the VM;
    create, by the first plugin, a consistency group ("CG") having the identified the first set of storage volumes used by the storage system to store the data for the set of virtual volumes used by the VM and generate a snapshot of the CG to take a snapshot of only the storage volumes in the first set of storage volumes used by the VM.

16. The system of claim 15, wherein the computer executable code further causes to:
creating, by the first plugin, a directory for the VM to attach a virtual disk to the VM for a restore operation.

17. The system of claim 15, wherein the computer executable code further causes to:
group, by the first plugin, the first set of storage volumes for taking the snapshot, based on a storage profile indicating a service level for the set of virtual volumes.

18. The system of claim 15, wherein the computer executable code further causes to:
discover, by the first plugin, all storage volumes within the logical data store; and
identify, by the first plugin, the first set of storage volumes from the discovered storage volumes.

19. The system of claim 15, wherein the computer executable code further causes to:
provision, by the virtual appliance, the set of virtual volumes for the VM based on a service level defined by a storage profile.

20. The system of claim 15, wherein the first plugin obtains VM files from the VM management system and uses the first API to obtain the first set of storage volumes from a storage operating system of the storage system.

* * * * *